Figure 1:
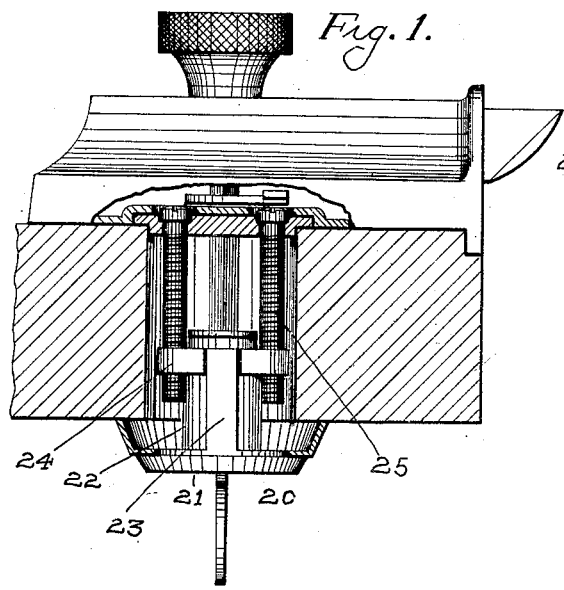

J. H. SHAW.
CYLINDER LOCK.
APPLICATION FILED FEB. 14, 1913.

1,115,744.

Patented Nov. 3, 1914.
2 SHEETS—SHEET 1.

WITNESSES:
Fred A. Carlson
Mary E. Fuller

INVENTOR:
John H. Shaw,
BY
Beach & Fisher
ATTORNEYS

J. H. SHAW.
CYLINDER LOCK.
APPLICATION FILED FEB. 14, 1913.

1,115,744.

Patented Nov. 3, 1914.

2 SHEETS—SHEET 2.

WITNESSES:
F. A. Carlson
Mary E. Fuller

INVENTOR:
John H. Shaw
BY
Black & Fisher
ATTORNEYS.

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

CYLINDER-LOCK.

1,115,744. Specification of Letters Patent. Patented Nov. 3, 1914.

Application filed February 14, 1913. Serial No. 748,404.

*To all whom it may concern:*

Be it known that I, JOHN H. SHAW, a citizen of the United States, residing in New Haven, county of New Haven, and State of Connecticut, have invented certain new and useful Improvements in Cylinder-Locks, of which the following is a full, clear, and exact description.

This invention relates to cylinder locks of the pin tumbler type, and the primary object of the invention is to provide a rim cylinder lock which is readily convertible into a mortise cylinder lock and vice versa.

When a cylinder lock is used in connection with a rim lock or latch it is referred to as a "rim cylinder", and when such a lock is secured to a lock case mortised in the door, such cylinder lock is referred to as a "mortise cylinder". Owing to the differences of their application, the usual rim cylinder is structurally different in several respects from the usual mortise cylinder and neither cylinder has been adapted to the function of the other. It has therefore been necessary to manufacture a distinct type of cylinder for every cylinder rim lock or latch and another distinct type for every cylinder mortise lock or latch. Heretofore, if a mortise cylinder has been required a rim cylinder has been of no utility, and conversely if a rim cylinder has been required a mortise cylinder could not be utilized.

I aim to obviate the above disadvantages by providing a cylinder lock of simple form which may be used with equal facility and satisfaction as a mortise cylinder or as a rim cylinder.

More particularly my purpose is to provide simple means adapted to be used in connection with the ordinary form of rim cylinder for converting it into a mortise cylinder. In doing this I utilize to the utmost the ordinary provisions of the rim type of cylinder for securing it in place in a lock and for transmitting movement from the key barrel or plug to the rollback. On the other hand, assuming that my lock is furnished to the trade in the form of a mortise cylinder, the detachment of a single simple part, which can be very readily effected, will suffice to convert the lock into one of the rim type. Moreover, I provide means whereby the ordinary rim cylinder can be converted into a mortise cylinder of the desired length to adjust the lock to the thickness of the door on which a mortise lock is used.

To these and other ends, the invention consists in the novel features and combinations of parts to be hereinafter described and claimed.

Figure 2:
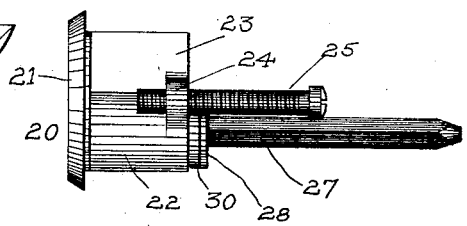
Figure 3:
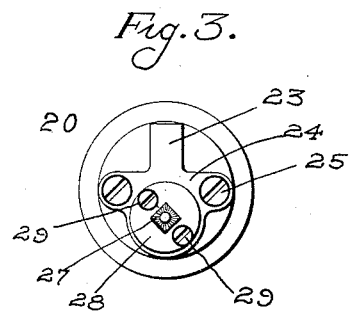
Figure 4:
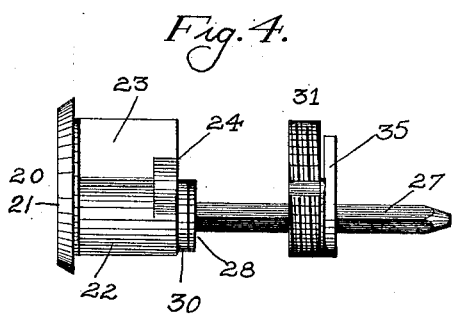
Figure 6:
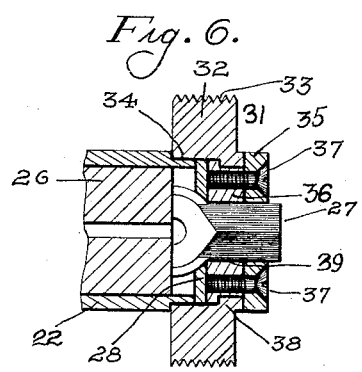
Figure 5:
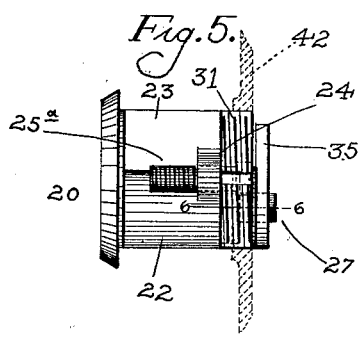
Figure 7:
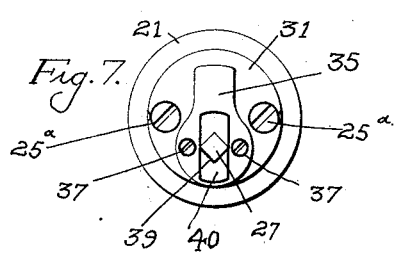
Figure 8:
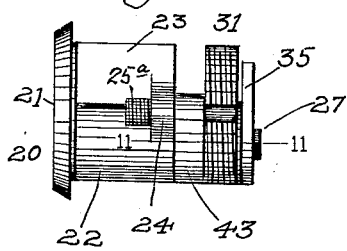
Figure 9:
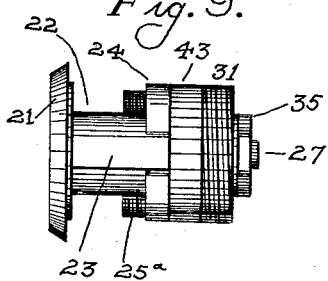
Figure 10:
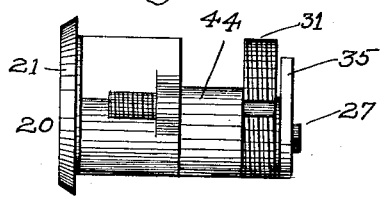
Figure 11:
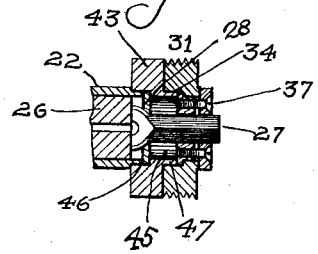
Figure 12:
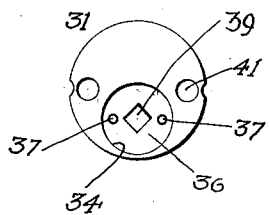
Figure 15:
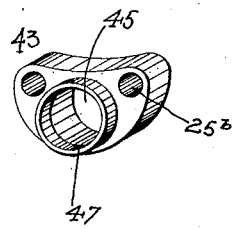
Figure 16:
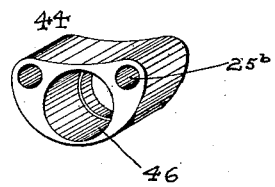
Figure 13:
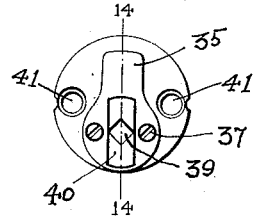
Figure 14:
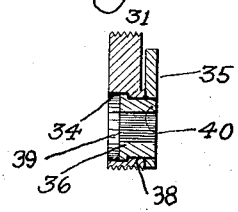

In the accompanying drawings, Figure 1 is a horizontal section through a portion of a door to which a standard cylinder rim night latch is applied, Fig. 2 is a side elevation of the standard rim cylinder lock shown in Fig. 1, Fig. 3 is a rear elevation of Fig. 2, Fig. 4 is a side elevation similar to Fig. 2, showing the operation of assembling the cylinder extension on the rim cylinder to convert it into a mortise cylinder, Fig. 5 shows the rim cylinder completely converted into a mortise cylinder, with the casing of the mortise lock indicated in dotted lines, Fig. 6 is an enlarged section on line 6—6 of Fig. 5, Fig. 7 is a rear elevation of the mortise cylinder shown in Fig. 5, Fig. 8 is a side elevation of the rim cylinder converted into a mortise cylinder of more than ordinary length, Fig. 9 is a top plan view of Fig. 8, Fig. 10 is a side elevation of a mortise cylinder lock of even greater length, Fig. 11 is a section on line 11—11 of Fig. 8, Fig. 12 is a front or inside view of the cylinder extension, Fig. 13 is a rear view of the cylinder extension, Fig. 14 is a section on line 14—14 of Fig. 13, and Figs. 15 and 16 are detail perspective views (taken from opposite sides) of the filler pieces shown in Figs. 8 and 10 respectively.

Referring to the drawings, and particularly to Figs. 1, 2 and 3, 20 is a standard pin tumbler cylinder lock of the type referred to in the trade as a "rim cylinder." The lock is called a rim cylinder because it is adapted for use with the ordinary forms of rim locks and latches substantially as shown in Fig. 1. The rim cylinder 20 comprises a face plate or escutcheon 21; a rearwardly directed cylindrical casing 22, having a pin tumbler extension 23; and laterally projecting fastening lugs 24 formed integral with the casing 22 and pin tumbler extension 23. When the lock is mounted in the manner shown in Fig. 1, it is secured to the door by means of screws 25 which are supported in a well known manner in a bore for the cylinder lock and are screwed at their inner ends into threaded openings in the lugs or extensions 24. I have not considered it necessary to illustrate and describe in detail the well known pin tumblers which are used in this lock, nor the barrel or key plug. However, a portion of the barrel or key plug is indicated at 26 in Fig. 6 and it will be understood that the movement of said key plug is transmitted to the rollback by means of the usual key rod 27 which is loosely connected with the rear end of the key plug by the customary washer 28 attached to the key plug by the screws 29. The washer 28 has a bearing on an annular shoulder 30 projecting rearwardly from the main part of the casing 22. The rim cylinder so far described, is of standard construction and I make no claim to the same.

In accordance with my invention, I convert the rim cylinder 20 into a mortise cylinder lock by substantially the following means: I construct what I term a cylinder extension 31 which consists of a circular disk of metal 32 having the required thickness. The periphery of the disk 32 is provided with screw threads 33. At one face of the cylinder extension the same is provided with a circular seat 34 (Figs. 6 and 12), and at the opposite face of the extension a bolt operating dog 35 is rotatably mounted. This dog 35 turns on an axis coincident with the axis of the circular opening 34, and the dog is rotatably mounted on the extension by means of a collar 36 which forms the bottom of the seat 34 and is attached to the dog 35 by screws 37. The seat 34 is formed as a counter-bore in an opening extending through the cylinder extension, and the counter-bore forms a shoulder 38 abutted on one side by the dog 37 and on the other side by a shoulder on the collar 36. The collar 36 is provided with a square opening 39 corresponding in cross-section to the key rod 27 and extending through a rearwardly projecting portion or spline 40 on said collar, on which the dog 35 is fitted by means of an appropriate opening. The cylinder extension 31, as thus constructed, may be applied to the rim cylinder 20 by passing the key rod 27 through the opening 39 and sliding the extension 31 up against the rear end of the casing 22. The seat 34 on the inner face of the cylinder extension is of such size and form as to nicely accommodate the rearwardly projecting shoulder 30 of the casing 22, and the washer 28, as shown in Fig. 6. In other words, the depth of the seat 34 is approximately equal to the depth of the shoulder 30 plus the thickness of the washer 28, so that the inner or front face of the cylinder extension may be brought into contact with the rear edge of the casing 22. By preference, the construction will be such that the front face of the cylinder extension will likewise abut the rear face of the pin tumbler extension 22 and the rear faces of the lugs 24. The parts are secured together in the position described by means of screws 25ª, as shown in Fig. 5. The screws 25ª may be formed by breaking or cutting off the longer screws 25, and they are passed through holes 41 in the cylinder extension and screwed into the perforated lugs 24. In this manner the cylinder extension may be readily and firmly secured to the rear end of the rim cylinder with its front face in contact with the rear edge of the casing 22, the rear face of the pin tumbler extension 23 and the rear faces of the lugs 24. The key rod 27 is then cut or sawed off substantially flush with the rear face of the dog 35, as shown in Figs. 5 and 6. The result will be a complete cylinder lock of the mortise type which can be screwed into the case 42 of a mortise lock in the manner shown in Fig. 5, the exterior screw threads 33 of the extension being engaged with similar threads in the opening of the lock case.

Of course, the rotary movement of the key plug 26 will be effectively transmitted to the dog 35 by means of the shortened key rod 27 which is non-rotatably fitted in said dog. In this case therefore, the key rod forms a coupling member between the key plug and the rotary member carried by the cylinder extension. In this manner the dog 35 will partake of the turning movement of the key plug in both directions.

The mortise cylinder lock shown in Fig. 5, is adapted to thin doors or those of ordinary thickness. When a thicker door is encountered, the length of the mortise cylinder may be increased by interposing a filler piece 43 between the rim cylinder and the cylinder extension, as shown in Figs. 8, 9 and 11. In case a still greater length of the cylinder lock is required, a filler piece 44 may be employed, as shown in Fig. 10. Should a still longer cylinder be required both of the filler pieces 43 and 44 may be used in an obvious manner. Of course, a number of filler pieces of different sizes may be furnished with each lock in order to meet different conditions, as will be understood. The filler pieces are preferably of substantially semi-circular form, as shown.

The construction of all of the filler pieces is substantially the same regardless of their thickness, and they are fitted in place in the manner shown in Fig. 11. Each filler piece is provided with an opening 45 which is counter-bored at one end as shown at 46 in Fig. 16, and surrounded at the opposite end (Fig. 15) with an annular shoulder 47. In the case of the filler piece 43 shown in Fig. 11, the counter-bore 46 will form a seat for the shoulder 30 of the rim cylinder, and on the other hand, the seat 34 of the cylinder extension will accommodate the shoulder 47. In this manner the cylinder, the filler piece and the extension will be snugly nested together in a firm and substantial manner. The parts will be secured together by screws 25ª, as before, the filler piece being provided with holes 25ᵇ to accommodate said screws. Of course, if two filler pieces are employed at the same time, the shoulder 47 of one of said filler pieces will seat in the counter-bore 46 of the other filler piece.

In changing over from a rim cylinder lock to a mortise cylinder, the point at which the key rod 27 will be cut off will be determined by the length of mortise cylinder which is required. The standard length of key rod as usually furnished for a rim lock or latch will ordinarily be more than sufficient to interlock the key plug and bolt operating dog in converting a rim cylinder into a mortise cylinder of any customary length.

It will be understood from the foregoing description, that the cylinder extension may be very easily and cheaply produced and that it can be applied to the standard form of rim cylinder by the utilization of the ordinary fastening lugs and screws. The conversion of the ordinary rim cylinder into a mortise cylinder is a matter of little trouble and slight expense, and hence the independent manufacture of the two different types of cylinder locks to the present large extent may be considerably reduced. The cylinder extension may be furnished to the trade separately, or assembled on a rim cylinder lock to constitute a mortise cylinder, the key rod being of its original length. When a rim cylinder is required the extension may be readily removed, and when a mortise cylinder is required the key rod may be readily cut off to the desired length.

Of course, I have not attempted to illustrate and describe the numerous modifications of my construction which may be adopted without digressing from the invention as defined in the claims.

In those aspects of the invention which concern particularly the coupling of the key plug to the dog by means of the usual key rod, the construction of the main part of the lock (i. e. whether of rim type or otherwise) is immaterial.

What I claim is:

1. The combination with a standard rim cylinder lock having laterally directed, interiorly threaded lugs on the respective sides, and attaching screws for engaging said lugs, of means for converting said lock into a mortise cylinder lock; substantially as described.

2. In a lock, the combination with a standard rim cylinder, of a cylinder extension adapted thereto for converting said rim cylinder into a mortise cylinder; substantially as described.

3. The combination with a rim cylinder lock having laterally extending lugs for mounting it in operative relation to a rim lock or latch, of a cylinder extension, and means for detachably securing said extension to said lugs; substantially as described.

4. The combination with a rim cylinder lock having laterally projecting, interiorly threaded lugs, and screws to engage said lugs and to connect the cylinder with a rim lock, of a cylinder extension adapted for connection to said cylinder by means of said screws; substantially as described.

5. The combination with a standard rim cylinder lock having perforated, interiorly threaded lugs on the respective sides, said lugs being located at the rear part of the lock, and being relatively shallow, and the perforations therein extending completely through said lugs, of a cylinder extension, and a pair of screws for securing said extension to said cylinder lock by means of said lugs, or for connecting said cylinder lock with a bolt mechanism of the rim type, by means of said lugs; substantially as described.

6. The combination with a cylinder lock having a key plug, a key rod extending rearwardly from said plug, a washer on the rear end of the plug, separate from said rod, but securing the latter to said plug, said cylinder lock having at its rear portion adjacent said washer an annular portion of reduced diameter, an extension disk having a seat snugly fitting over said shoulder and inclosing said washer, and means for securing said disk to the main part of the lock; substantially as described.

7. The combination with a cylinder lock having laterally projecting lugs at the upper rear portion thereof, a key plug, an annular shoulder around the key plug, projecting rearwardly from the plane of the rear faces of said lugs, a washer bearing on said shoulder and secured to the rear end of the key plug, and coupling means secured to the key plug by said washer, of a cylinder extension having a seat for said washer and adapted to fit over said shoulder and contact with the rear surfaces of said lugs, and a dog on said extension connected with said coupling means; substantially as described.

8. The combination with a cylinder lock having a portion of reduced diameter extending around the rear portion of the key plug, a washer secured to the rear end of the key plug, coupling means secured to the key plug by said washer, and a cylinder extension having a seat adapted to inclose said washer and fit over said portion of reduced diameter so that the main portion of the cylinder forms a stop for said extension, and a dog on said extension connected with said coupling means; substantially as described.

9. The combination with a cylinder lock having a key plug, a key rod extending rearwardly from said plug, and a washer on the rear end of the plug securing said rod to the latter, of a cylinder extension seated over said key rod and washer and detachably secured to the lock casing; substantially as described.

10. The combination with a cylinder lock having a key plug, a washer secured to the rear end of the plug, and a key rod secured to the plug by the washer, of a cylinder extension having a seat for the washer, and a dog rotatably mounted on said extension and having a seat for the key rod; substantially as described.

11. The combination with a cylinder lock having a key plug, a washer secured to the end of said plug, and a rod secured to said plug by said washer, of a cylinder extension having a seat for said washer, a dog on said extension having a through opening for said rod, and means for detachably securing said extension in position; substantially as described.

12. The combination with a standard rim cylinder lock having a casing, laterally projecting interiorly threaded lugs on said casing, a key plug in said casing, and a key rod extending rearwardly from said plug, of a cylinder extension, means to secure said extension detachably to said lugs, and a dog on said extension adapted to seat on said key rod; substantially as described.

13. The combination with a standard rim cylinder lock, comprising a casing, perforated threaded lugs projecting laterally from said casing, a key plug rotatable in said casing, and a rod extending rearwardly from said plug, of a cylinder extension, a dog on said extension adapted to seat on said rod, and screws passing through said extension into said perforated threaded lugs; substantially as described.

14. The combination with a standard rim cylinder lock, comprising a casing, laterally projecting fastening lugs on said casing, a key plug rotatable in said casing, a washer secured to the rear end of said plug outside of the casing, and a rod secured to said plug by said washer, of a cylinder extension having a seat for said washer and adapted to contact at one face with the rear faces of said lugs, means for securing said extension to said lugs, and a dog on said extension having means to engage said rod non-rotatively; substantially as described.

15. The combination with a standard rim cylinder lock, comprising a casing, laterally projecting fastening lugs on said casing, a key plug rotatable in said casing, a washer secured to the rear end of said plug outside of the casing, and a rod secured to said plug by said washer, of a cylinder extension having a seat for said washer and adapted to contact at one face with the rear faces of said lugs, means for securing said extension to said lugs, and a dog on said extension having a through opening conforming to said rod; substantially as described.

16. The combination with a cylinder lock, and a cylinder extension therefor, of a filler piece interposed between said lock and said extension; substantially as described.

17. The combination with a cylinder lock, and a cylinder extension therefor, of a plurality of filler pieces of different widths adapted to be interposed individually or collectively between said lock and said extension; substantially as described.

18. The combination with a rim cylinder lock having a rearwardly extending key rod, of a filler piece having an opening through which said rod extends rearwardly, and a cylinder extension between which and the casing of the lock said filler piece is interposed; substantially as described.

19. The combination with a rim cylinder lock having laterally projecting fastening lugs, and a rearwardly extending key rod, of a filler piece having a through opening for said key rod, a cylinder extension between which and the lock casing said filler piece is interposed, and screws for securing said extension and said filler piece to said laterally projecting lugs; substantially as described.

20. The combination with a rim cylinder lock having laterally projecting fastening lugs, said lugs being provided with interiorly threaded perforations, of a filler piece applied to the rear end of the lock casing, a cylinder extension between which and the lock casing said filler piece is interposed, and screws passing through the cylinder extension and the filler piece into the openings of said fastening lugs; substantially as described.

21. The combination with a rim cylinder lock, having a casing, a key plug rotatable in said casing, a washer secured to the rear end of said key plug outside of the casing, and a rearwardly projecting rod secured to the key plug by said washer, of a filler piece having a through opening for said rod and a seat for said washer, and a cylinder extension between which and the lock casing said filler piece is interposed; substantially as described.

22. The combination with a cylinder lock having a circular projecting part at the rear end thereof, of a filler piece having a seat for said circular projecting part at one face of said filler piece, and having an annular shoulder projecting from the opposite face of said filler piece, and a cylinder extension having a seat for said annular shoulder; substantially as described.

23. As an article of manufacture, a filler piece for cylinder locks having a through circular opening with a seat around said opening at one end, and an annular shoulder around the other end of said opening projecting out from the face of the filler piece; substantially as described.

24. As an article of manufacture, a filler piece for cylinder locks having a through circular opening counterbored at one end, and an annular shoulder projecting outward from the opposite face of said filler piece and defining the other end of said opening; substantially as described.

25. As an article of manufacture, a filler member for cylinder locks, comprising a substantially semi-circular block or piece having a through circular opening counterbored at one end and defined at the opposite end by a shoulder projecting laterally beyond the face of said block or piece, there being screw openings through said piece on opposite sides of said first named opening; substantially as described.

In witness whereof, I have hereunto set my hand on the 12th day of February, 1913.

JOHN H. SHAW.

Witnesses:
 CURTIS P. WILLIAMS,
 BERTHA RAY.

Copies of this patent may be obtained for five cents each, by addressing the "Commissioner of Patents, Washington, D. C."